(12) United States Patent
Atmopawiro et al.

(10) Patent No.: US 11,303,444 B2
(45) Date of Patent: *Apr. 12, 2022

(54) METHOD FOR SYNCHRONIZED SIGNATURE WITH ADDITIVE RSA KEY SPLITTING USING EARLY FLOATING EXPONENT NEGOTIATION

(71) Applicant: THALES DIS FRANCE SA, Meudon (FR)

(72) Inventors: Alsasian Atmopawiro, Meudon (FR); Thi Tra Giang Dang, Meudon (FR)

(73) Assignee: Thales DIS France SA, Meudon (FR)

( * ) Notice: Subject to any disclaimer, the term of this patent is extended or adjusted under 35 U.S.C. 154(b) by 326 days.

This patent is subject to a terminal disclaimer.

(21) Appl. No.: 16/469,526

(22) PCT Filed: Dec. 12, 2017

(86) PCT No.: PCT/EP2017/082430
§ 371 (c)(1),
(2) Date: Jun. 13, 2019

(87) PCT Pub. No.: WO2018/108915
PCT Pub. Date: Jun. 21, 2018

(65) Prior Publication Data
US 2020/0084034 A1    Mar. 12, 2020

(30) Foreign Application Priority Data

Dec. 15, 2016 (EP) ..................................... 16204277

(51) Int. Cl.
*H04L 9/30* (2006.01)
*H04L 9/32* (2006.01)

(52) U.S. Cl.
CPC ............ *H04L 9/302* (2013.01); *H04L 9/3249* (2013.01); *H04L 9/3263* (2013.01); *H04L 9/3271* (2013.01); *H04L 2209/46* (2013.01)

(58) Field of Classification Search
CPC ..... H04L 9/302; H04L 9/3249; H04L 9/3263; H04L 9/3271; H04L 2209/46
See application file for complete search history.

(56) References Cited

U.S. PATENT DOCUMENTS

| 6,404,890 | B1* | 6/2002 | Lenstra | ................... | H04L 9/302 |
|           |     |        |         |                     | 380/268    |
| 7,093,133 | B2* | 8/2006 | Hopkins | ................. | H04L 9/302 |
|           |     |        |         |                     | 713/176    |

(Continued)

OTHER PUBLICATIONS

PCT/EP2017/082430, International Search Report, dated Mar. 6, 2018, European Patent Office, P.B. 5818 Patentlaan 2 NL—2280 HV Rijswijk.

(Continued)

*Primary Examiner* — Yin Chen Shaw
*Assistant Examiner* — Alex D Carrasquillo
(74) *Attorney, Agent, or Firm* — The Jansson Firm; Pehr B. Jansson

(57) ABSTRACT

The present invention relates to a method of secure generation by a client device A and a server device B of at least a RSA current signature and a RSA next signature with a private exponent component d of an RSA key, comprising: •a handshake phase (P1) comprising: a. receiving (S1) a handshake request comprising a hash of the next client value (pvA_next), b. checking (S2) the value of the next client value (pvA_next) and: —when the next client value (pvA_next) equals a first default value (DUMMY): generating (S3) a new value (x) and updating the next server value (pvB_next) with the generated new value, and sending (S4) to the client device (A) the generated new value (x), to be used by the client device as next client value (pvA_next), —when the next client value (pvA_next) is not equal to said first default value (DUMMY): checking the value of the next server value (pvB_next) and when the next server value (pvB_next) is equal to a second default value (NULL) and the next client value (pvA_next) equals the current server value (pvB): sending to the client device (A) a fix request; and when the next server value (pvB_next) is equal to said second default value (NULL) and the next client value (pvA_next) is not equal to the current server value (pvB), suspending performing said method. •a signing phase (P2) performed by the server device (B) after the handshake phase and generating the current signature; said signing phase comprising: a. generating (S5) a server part of the current RSA signature (HS2) from the server device private exponent component (dB) and from an updated server (Continued)

dynamic offset (hB') function of the current server dynamic offset (hB) and of a server shift value (cB), said server shift value (cB) being function of the current server value (pvB), such that the current RSA signature can be generated by combining said server part of the current RSA signature (HS2) and a client part of the current RSA signature (HS1) generated by the client device (A), b. setting (S8) the current server dynamic offset (hB) to the updated server dynamic offset (hB') value, the current server value (pvB) to the value of the next server value (pvB_next) and the next server value (pvB_next) to a second default value (NULL), •performing the handshake phase and the signing phase with the next signature as current signature, for generating the next signature.

13 Claims, 3 Drawing Sheets

(56) References Cited

U.S. PATENT DOCUMENTS

| | | | | |
|---|---|---|---|---|
| 8,364,967 | B2* | 1/2013 | Sudia | H04L 9/085 |
| | | | | 713/180 |
| 2005/0063548 | A1* | 3/2005 | Antipa | H04L 9/302 |
| | | | | 380/285 |
| 2007/0081667 | A1* | 4/2007 | Hwang | H04L 9/3226 |
| | | | | 380/30 |
| 2008/0080707 | A1* | 4/2008 | Gueron | H04L 9/302 |
| | | | | 380/30 |
| 2008/0104402 | A1* | 5/2008 | Gueron | H04L 9/302 |
| | | | | 713/176 |
| 2008/0148055 | A1* | 6/2008 | Ferguson | H04L 9/302 |
| | | | | 713/176 |

OTHER PUBLICATIONS

PCT/EP2017/082430, Written Opinion of the International Searching Authority, dated Mar. 6, 2018, European Patent Office, D-80298 Munich.
Blakiexicz et al: "Signatures for e-Government Digital Signatures for e-Government—a Long-Term security Architecture", , (Nov. 11, 2010), XP055376941, Retrieved from the Internet: URL:http://kutylowski.im.pwr.wroc.pl/articles/E-Forensics2010-presentation.pdf [retrieved on May 30, 2017].
Mihir Bellare et al: "The Security of Practical Two-Party RSA Signature Schemes", International Association for Cryptologic Research,, vol. 20020610:021238, (Jun. 10, 2002), pp. 1-26, XP061000234.
Kutylowski M et al: "Mediated RSA cryptography specification for additive private key splitting (mRSAA); draft-kutylowski-mrsa-algorithm-02.txt", Mediated RSA Cryptography Specification for Additive Private Key Splitting (MRSAA); draft-kutylowski-mrsa-algorithm-02.txt, Internet Engineering Task Force, IETF; Standardworkingdraft, Internet Society (ISOC) 4, Rue Des Falaises Ch-1205 Geneva,Swit, (Apr. 28, 2012), pp. 1-58, XP015082627, p. 7-p. 46.

* cited by examiner

METHOD FOR SYNCHRONIZED SIGNATURE WITH ADDITIVE RSA KEY SPLITTING USING EARLY FLOATING EXPONENT NEGOTIATION

FIELD OF THE INVENTION

The present invention relates to the field of signature generation by secure multi party computation (SMC) using additive RSA key splitting with floating exponent, and more particularly to a server device allowing to maintain synchronization between a client device and the server device while preventing device cloning attacks

BACKGROUND OF THE INVENTION

In order to provide a proof that it is the author of a given message, any client device can implement an existing signature process such as RSA to sign said message using a private key.

Many existing client device only offer a low security level. An attacker could therefore retrieve the private key of the client device by a brute-force attack on key storage, then enabling him to forge signatures on behalf of the client device.

In order to prevent such attacks, secure multi party computation (SMC) signing processes have been proposed in which different parties, such as a client and a server, possess their own key parts and must cooperate to produce a valid signature. As a result, an attacker retrieving the key part of one party is not able to forge a valid signature. SMC processes have been proposed for RSA signature scheme, such additive key splitting ("Instantaneous revocation of security capabilities", D. Boneh, X. Ding and G. Tsudik, Usenix 2001) in which the RSA key is the sum of the RSA key parts hold by the parties, and such multiplicative splitting ("The security of practical two-party RSA signature schemes", M. Bellare and R. Sandhu, eprint IACR 2001) in which the RSA key is the product of the RSA key parts hold by the parties.

Such SMC signature processes are subject to device cloning attack. In such attacks, an attacker holding a clone of a client device can interact with a server device in order to perform such a SMC signature process and obtain a valid signature of a message as if the original client device had been in interaction with the server device.

In order to prevent such attacks, an exponent floating technique has been proposed, in which each party key part is refreshed at each transaction, using a dynamic offset which is incremented after each transaction. Then a client device and a server device can successfully interact for generating a signature only if both use the same dynamic offset. Using such a technique, if both a valid client device and a clone client device try to interact with the same server, the offset of the server and the offsets of the clients won't match anymore and the server can detect the clone client device as an illegitimate device ("Digital signatures for e-government—a long term security architecture", P. Blaskiewicz, P. Kubiak and M. Kutylowski, Forensics 2000).

The floating exponent technique has the major drawback of being sensitive to device desynchronization. If the client device and the server device get desynchronized, for example because of network issues during a signature process leading to increment the dynamic offset on the server side but not on the client side, their dynamic offsets won't be equal anymore and they won't be able anymore to interact for producing a signature.

Consequently, there is a need for a SMC signature process based on RSA scheme, protected against device cloning attacks using the floating exponent technique and enabling to maintain client and server synchronization while remaining secure against device cloning attacks.

SUMMARY OF THE INVENTION

For this purpose and according to a first aspect, this invention therefore relates to a method of secure generation by a client device and a server device of at least a first RSA signature, called current signature, of a first message to be signed and a second RSA signature, called next signature, of a second message to be signed, with a private exponent component d of an RSA key (p, q, N, d, e), where e is a public exponent component, N is a RSA modulus, p, q primes such N=p·q and e·d=1 modulo phi(N) with phi(N) Euler's function, wherein said client device stores a client device private key equal to (N, dA) with dA a client device private exponent component, a current client value, a next client value and a current client dynamic offset, and wherein said server device stores a server device private key equal to (N, dB) with dB a server device private exponent component, a current server value, a next server value, where dB=d−dA modulo phi(N), and a current server dynamic offset, said method comprising:
  a handshake phase performed by the server device comprising:
    a. receiving from the client device a handshake request comprising a hash of the next client value,
    b. checking the value of the next client value and:
    when the next client value equals a first default value:
      generating a new value and updating the next server value with the generated new value,
      sending to the client device the generated new value, to be used by the client device as next client value,
    when the next client value is not equal to said first default value:
      checking the value of the next server value,
      when the next server value is equal to a second default value and the next client value equals the current server value:
        sending to the client device a fix request asking the client device to update the current client value with the value of the stored next client value,
        generating a new value and updating the next server value with the generated new value,
        sending to the client device the generated new value, to be used by the client device as next client value,
      when the next server value is equal to said second default value and the next client value is not equal to the current server value, suspending performing said method,
      when the next server value is not equal to said second default value:
        generating a new value and updating the next server value with the generated new value,
        sending to the client device the generated new value, to be used by the client device as next client value,
  and a signing phase performed by the server device after the handshake phase and generating the current signature; said signing phase comprising:

generating a server part of the current RSA signature from the server device private exponent component and from an updated server dynamic offset, said updated server dynamic offset being function of the current server dynamic offset and of a server shift value, said server shift value being function of the current server value, such that the current RSA signature can be generated by combining said server part of the current RSA signature and a client part of the current RSA signature generated by the client device from the client device private exponent component and from an updated client dynamic offset, said updated client dynamic offset being function of the current client dynamic offset and of a client shift value, said client shift value being function of the current client value, setting the current server dynamic offset to the updated server dynamic offset value, the current server value to the value of the next server value and the next server value to said second default value, the current client dynamic offset being set to the updated client dynamic offset value, the current client value being set to the value of the next client value and the next client value being set to said first default value.

performing the handshake phase and the signing phase with the next signature as current signature, for generating the next signature.

Such a method enables to keep the client device and the server device synchronized in order to be able to produce a signature using a secure multi party computation, even after a failure of the previous signature process, while still defeating cloning device attacks.

The client device private exponent component dA or the server device private exponent component dB may be a random integer in [0,phi(N)].

Said client shift value may be generated by a pseudo random number generator from a secret value pre-shared between the client device and the server device and from the current client value, and said server shift value may be generated by a pseudo random number generator from said secret value and from the current server value.

By doing so, the client shift value and the server shift value may remain identical, enabling the client device and the server device to successfully interact for producing a signature using SMC RSA splitting with floating exponent. In the same time the client shift value can't be guessed by an attacker unless he has knowledge of both the secret value and the current client value.

Said updated client dynamic offset may be equal to the sum of the current client dynamic offset and the client shift value, and wherein said updated server dynamic offset is equal to the sum of the current server dynamic offset and the server shift value.

Said client part of the current RSA signature may be generated by the client device using as signing key the sum of the client device private exponent component and the updated client dynamic offset.

Said server part of the current RSA signature may be generated by the server device using as signing key the result of subtracting the updated server dynamic offset from the server device private exponent component.

Using such dynamic offsets and such signing keys enables to combine both parts of the current RSA signature such that both dynamic offsets cancel each other.

Said signing phase may comprise:
receiving said client part of the current RSA signature from said client device,
generating the current RSA signature by combining the received client part of the current RSA signature and said server part of the current RSA signature.

By doing so, the server device can generate the current RSA signature without disclosing any information to the client device and without knowing the client device private exponent. This method enables preparing at the same time the generation of the next signature server side and client side by computing the next client value and the next server value.

The signing phase may also comprise verifying the generated current RSA signature. This enables the server device to verify that the RSA signature was successfully generated based on both parts of the signature.

In an embodiment, said client device stores a client clone counter and said server device stores a server clone counter, and said method according to the first aspect comprises:
receiving from the client device the client clone counter incremented by one unit,
checking if the incremented client clone counter is greater than the server clone counter and:
if the incremented client clone counter is greater than the server clone counter, updating said server clone counter with the received value of the client clone counter,
else, suspending performing said method.

Thus, protection against device cloning attack is improved, any client device with a client clone counter lower than or equal to the server clone counter being recognized as a clone device.

The client part of the current RSA signature HS1 of a message to be signed M may be equal to $H(M)^{dA+hA'}$ mod n, the server part of the current RSA signature HS2 of said message to be signed M may be equal to $H(M)^{dB-hB'}$ mod n, and the current RSA signature of said message to be signed M is equal to HS1*HS2 mod n, with H(M) a hashing of said message to be signed M.

According to a second aspect, this invention therefore relates also to a computer program product directly loadable into the memory of at least one computer, comprising software code instructions for performing by a computer's processor the steps of the method according to the first aspect when said product is run on the computer.

According to a third aspect, this invention therefore relates also to a server comprising a processor and an interface configured to perform the steps of the method according to the first aspect, a memory configured to store said server device private key, said current server value, said next server value, and said current server dynamic offset.

According to a fourth aspect, this invention therefore relates also to a system comprising a server according to the third aspect and a client device.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

The invention relates to a method of secure generation of a RSA signature involving a secure multi party computation during which a client device A and a server device B must cooperate for generating said signature.

Figure 1:
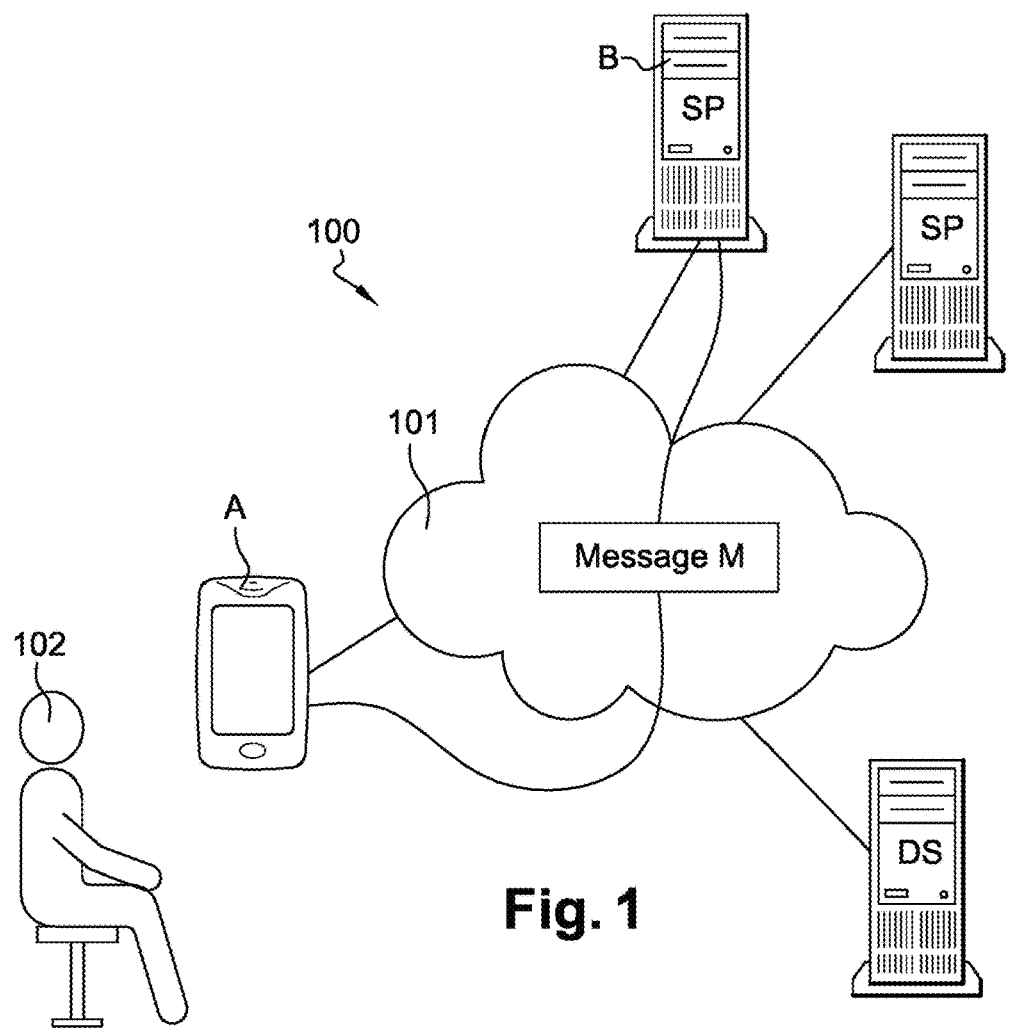
FIG. 1 is a schematic illustration of a system comprising a client device A and one or more remote server devices B according to an embodiment of the present invention.

FIG. 1 is a schematic illustration of a network 101 connecting a client device A to a server device B. The network 101 may be secure such that the communication between the client device A and the server device B may be performed via a secure channel. The client device A is operated by a user 102 and interacts with the server device B.

Such a configuration should not be interpreted as a limitation of the invention and an alternate embodiment of the invention could involve a secure multi party computation between the client device and more than one server device.

The client device A may be any electronic device including a processor. For example it may be a personal computer PC, a mobile device such as a smartphone or a tablet, or a public terminal in a bank or a point of sale. It may also be a simple chip included in a smart card or a credit card. The server device B is preferably a computer but it could also be any other electronic device including processing means.

Figure 2:
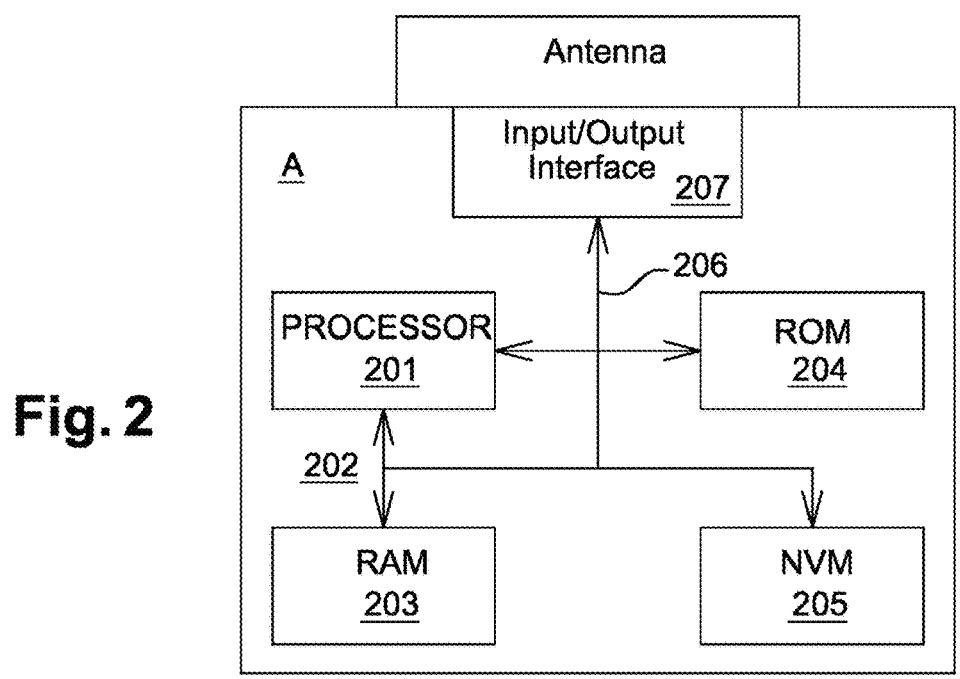
FIG. 2 is a schematic illustration of a client device A according to an embodiment of the present invention.

FIG. 2 is a schematic illustration of a client device A, for example, a mobile telephone, tablet, or personal computer. The client device A may include a processor 201 connected via a bus 202 to a random access memory (RAM) 203, a read-only memory (ROM) 204, and/or a non-volatile memory (NVM) 205. The client device A further includes a connector 206 connected to the processor and by which the client device A may be connected to an antenna. Such an antenna may be used to connect the client device A to various forms of wireless networks such as the network 101, e.g., wide-area networks, WiFi networks, or mobile telephony networks. Alternatively, the client device may connect to networks via wired network connections such as Ethernet.

Figure 3A:
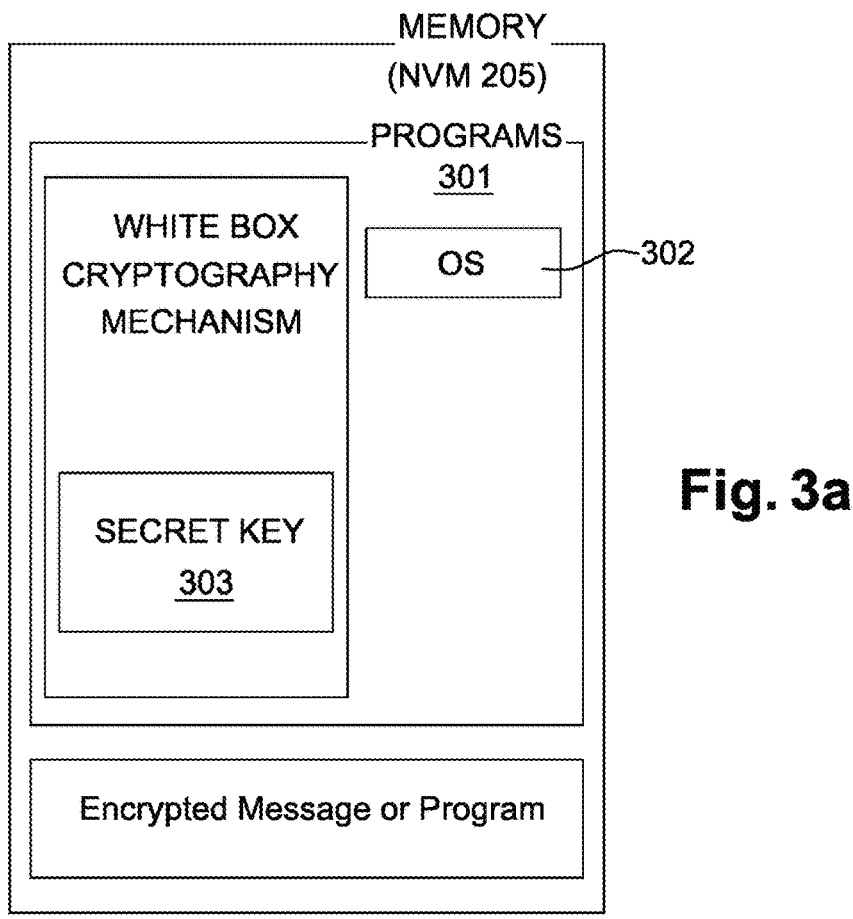
FIGS. 3a and 3b are a schematic illustrations of programs and data stored in a memory of the client device of FIG. 2.
Figure 3B:
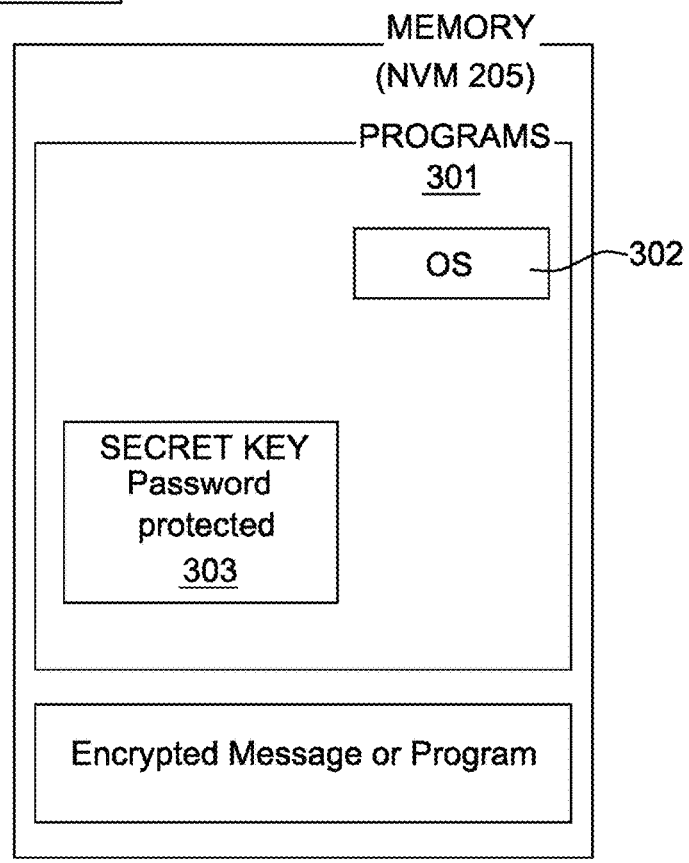

The ROM 204 and/or NVM 205 may include computer programs 301 as is illustrated in FIGS. 3a and 3b. While it is here depicted that the computer programs 301 are all co-located in the ROM 204 or the NVM 205, in actual practice there is no such restriction as programs may be spread out over multiple memories and even temporarily installed in RAM 203. The programs 301 include operating system programs 302 as well as application programs loaded onto the client device. The client device may also include input/output means 207 providing interfaces to the user of the client device, such as one or more screens, loudspeakers, a mouse, tactile surfaces, a keyboard etc. . . .

Figure 4:
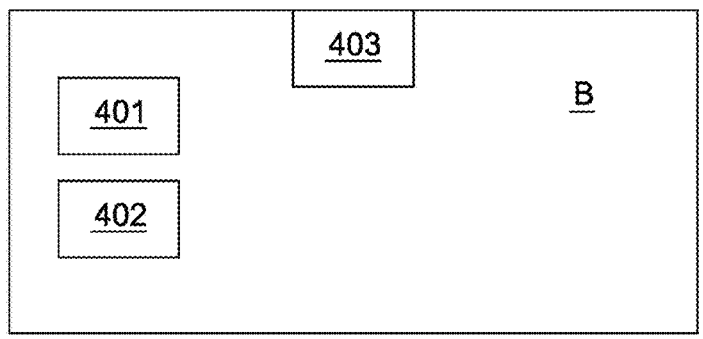
FIG. 4 illustrates schematically a server device B according to an embodiment of the present invention.

As illustrated in the FIG. 4, the server B includes at least a processor 401 for performing the operations needed for generating a signature, a memory 402 such as a RAM, a ROM and/or a NVM, and a wired or wireless network interface 403 for connecting to the network 101 and exchanging messages at least with the client device.

The invention aims at securely generating a signature of a message to be signed with a RSA key (p, q, N, d, e), where d is a private exponent component, e is a public exponent component, N is a RSA modulus, p, q primes such $N = p \cdot q$, and $e \cdot d = 1$ modulo phi(N) with phi(N) Euler's function.

In order to generate such a signature through a secure multi party computation SMC, the RSA key is broken into a client device private key and a server device private key. The client device A stores a client device private key equal to (N, dA) with dA a client device private exponent component. The server device B stores a server device private key equal to (N, dB) with dB a server device private exponent component.

As depicted on FIG. 3a, a sub-part of the memory, ROM and/or NVM, of the client device may securely store sensitive data 303 such as the client device private key (N, dA). Alternatively, as depicted on FIG. 3b, sensitive data such as the client device private key may be stored in the same part of the memory than less sensitive data but sensitive data may be password protected by a client password. Alternatively, the client device private key may be stored remotely, in an online data storage vault for example. Such data may be stored under an encrypted format. Similarly the server device private key (N, dB) may be stored in a secured area of the server memory or on a remote server, possibly under an encrypted format.

The embodiment described here under makes use of an additive splitting of the RSA secret key. In such a case, the client device private key (N, dA) and the server device private key (N, dB) are such that $dB = d - dA$ modulo phi(N).

Either the client device private exponent component dA or the server device private exponent component dB may be a random integer drawn in [0, phi(N)]. Such a drawing may be performed by the server device or by a trusted keysplit server connected to the client device and the server device. When the client device private exponent component dA is randomly drawn, the server device private exponent component dB is such that $dB = d - dA$ modulo phi(N). Alternatively when the server device private exponent component dB is randomly drawn, the client device private exponent component dA is such that $dA = d - dB$ modulo phi(N).

In order to protect the signature process against device cloning attacks, the method implements the floating exponent technique. In order to do so, the client device stores a current client dynamic offset hA and the server device stores a current server dynamic offset hB. Then, at each signature generation, both offsets are updated and each device generate a part of the signature using as signature key its private exponent component dA or dB and the updated dynamic offset.

As explained here above, such a technique prevents an attacker unaware of the correct offset value to be used from successfully interacting with the server device for producing a signature. But it is also sensitive to desynchronization: if one device updates its offset and the other one does not, offsets get desynchronized and the signature process cannot be successfully performed anymore.

In such a context, the invention aims at maintaining client and server synchronization while remaining secure against device cloning attacks.

In order to do so, the client device stores a current client value pvA and the server device stores a current server value pvB. For generating a current signature of a first message to be signed M, each device updates its dynamic offset based on its current client value pvA or current server value pvB. In order to prepare the generation of the next signature of a second message to be signed M', the client device also stores a next client value pvA_next, the server device stores a next server value pvB_next, and before generating the current signature, the client device and the server share a common value for their next client value pvA_next and next server value pvB_next, to be used for updating their dynamic offsets when generating the next signature of the second message M'.

Doing so ensure that, unless a failure occurs during the signature process, the dynamic offsets of the client device and the server device for the next signature will be identical and generation of the next signature will be successful.

In order to cope with a possible desynchronization of the client dynamic offset and the server dynamic offset, the method includes steps performed before generating a signature for a message and checking if the client device and the server device have been desynchronized since the last signature, and fixing the client state if needed.

Figure 5:
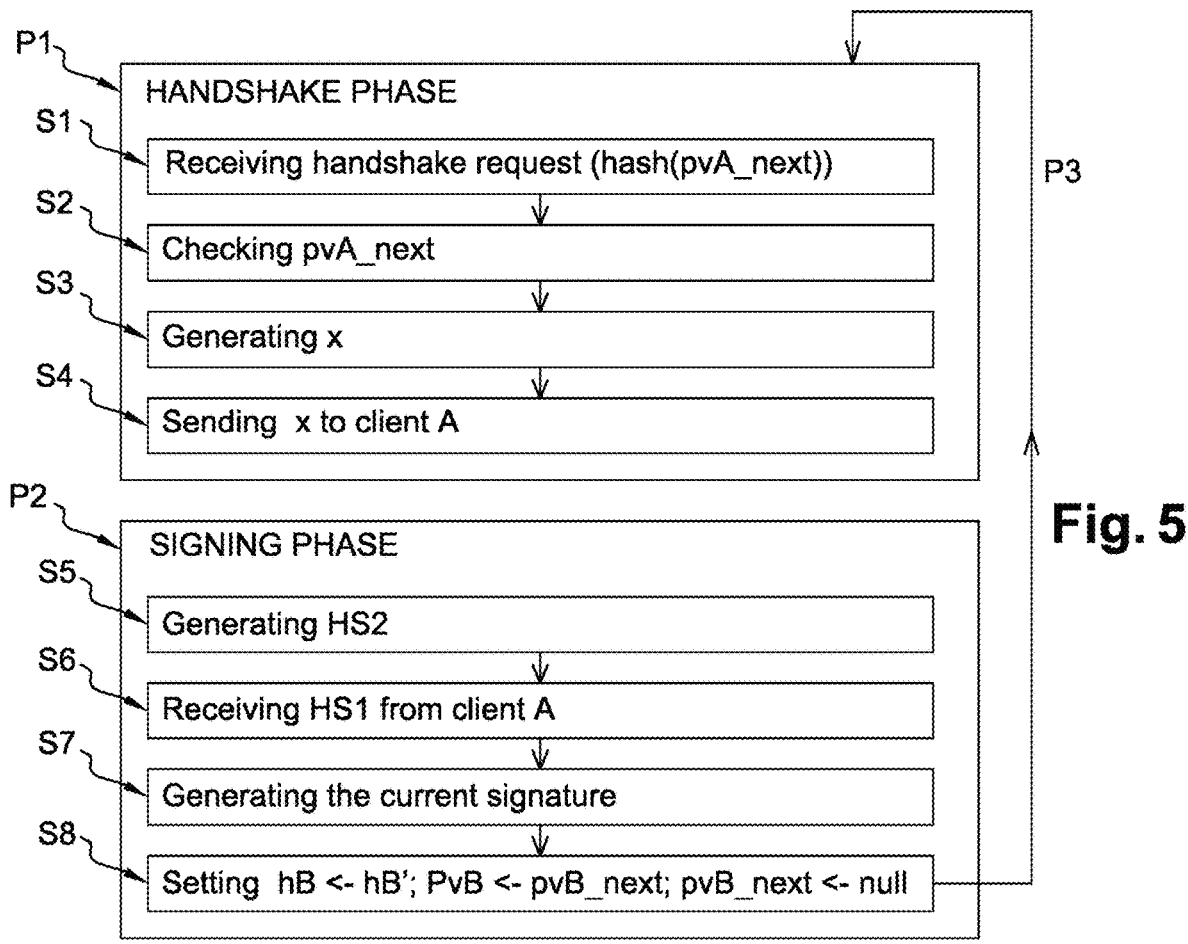
FIG. 5 illustrates schematically a method of generating a current RSA signature and a next RSA signature according to an embodiment of the present invention.

The following paragraphs describe the steps of a method generating a signature performed by the server device B according to a first aspect of the invention as depicted on FIG. 5.

In order to generate at least a first RSA signature, called current signature, of a first message to be signed M and a second RSA signature, called next signature, of a second message to be signed M', the method first comprises a handshake phase P1 performed by the server device B.

Such a handshake phase P1 aims at checking the synchronization of the client device and the server device, synchronizing them again in some cases, and setting the value of the next client value pvA_next and the next server value pvB_next, to be used for the next signature, after generation of the current signature. Such a handshake phase comprises several steps described in the following paragraphs.

In a first reception step S1 the server device B receives from the client device A a handshake request comprising a hash of the next client value pvA_next.

In a checking step S2, the server device checks the value of the next client value pvA_next using the hash received from the client device A. Such a check can be performed by comparing the received hash to hash values of several values detailed hereunder.

As detailed hereunder, at the end of the signature generation process, the next client value pvA_next is supposed to be set to a first default value, here called DUMMY value.

During this checking step S2, when the server device determines that the next client value pvA_next equals the first default value DUMMY, it can be considered that the previous signature generation was successful. The server device then performs the next step of the handshake phase, which is the first generation step S3 described hereunder.

During this checking step S2, when the server device determines that the next client value pvA_next is not equal to the first default value DUMMY, it may be deduced that the previous signature generation was not fully completed. There is a chance that:
 the server device used its current server value pvB for the current signature and then updated its current server value pvB with its next server value pvB_next in order to be ready for generating the next signature;
 and that the client device did not update its current client value pvA with its next client value pvA_next.

In such a case, the client device and the server are desynchronized and cannot generate a RSA signature anymore. Consequently during this checking step S2, the server also checks the value of the next server value pvB_next in order to determine if the server ended the previous signature generation normally or not. When the server determines that the next server value pvB_next is equal to a second default value NULL, which is the mark of a normal end of the signature generation process on the server side, as described here under, and that the next client value pvA_next equals the current server value pvB, the server device may then send to the client device A a fix request asking the client device A to update the current client value pvA with the value of the stored next client value pvA_next. By doing so the client device is synchronized again with the server device. The server device then performs the next step of the handshake phase, which is the first generation step S3 described hereunder. The sending of the fix request and the first generation step S3 may be performed at the same time.

During this checking step S2, when the server device determines that the next server value pvB_next is equal to said second default value NULL and the next client value pvA_next is neither equal to the first default value DUMMY nor to the current server value pvB, it can be deduced that the client device may be a clone of a legitimate client device. The server device may then suspend performing the method of generating a signature and flag the client as a probable clone device.

During this checking step S2, when the server device determines that the next server value pvB_next is not equal to said second default value NULL, it can be deduced either that after the last handshake phase no signature generation process was launched, for example because the client device crashed or because of network issues, or that the previous signature generation process ended before its normal end without updating either the next client value pvA_next or the next server value pvB_next. In order to set a new shared value to the next client value pvA_next and the next server value pvB_next, the server device may then perform the next step of the handshake phase, which is the first generation step S3 described hereunder, whatever the value of the next client value pvA_next and without sending any fix request.

In a first generation step S3, the server device generates a new value x and updates the next server value pvB_next with the generated new value to be used in the future for generating the next signature.

In a sending step S4, the server client sends to the client device A the generated new value x, to be used by the client device as next client value pvA_next.

The method then comprises a signing phase P2 performed by the server device B after the successful achievement of the handshake phase and generating the current signature.

Said signing phase comprises a second generation step S5 during which the server device generates a server part of the current RSA signature HS2 from the server device private exponent component dB and from an updated server dynamic offset hB'. In an embodiment the server part of the current RSA signature HS2 is generated by the server device B using as signing key the result of subtracting the updated server dynamic offset hB' from the server device private exponent component dB. In an embodiment HS2=H $(M)^{dB-hA'}$ mod n with H(M) a hashing of said message to be signed M The updated server dynamic offset hB' may be function of the current server dynamic offset hB and of a server shift value cB. In an embodiment, the updated server dynamic offset hB' is equal to the sum of the current server dynamic offset hB and the server shift value cB: hB'=hB+cB.

The server shift value cB may be function of the current server value pvB. In an embodiment the server shift value cB is generated by a pseudo random number generator from a secret value called seed_offset pre-shared between the client device A and the server device B and from the current server value pvB: cB=PRNG(seed_offset, pvB).

In an alternate embodiment different paddings schemes may be used when generating the client part and the server part of said RSA signature, such as the padding disclosed in PKCS #1_v1.5, PSS padding disclosed in PKCS #1v2.1 RFC 3447, and the padding disclosed in PKCS #7 RFC2315. In such a case HS1=H(EM)$^{dA+hA'}$ mod n and HS2=H (EM)$^{dB-hB'}$ mod n with H(EM) a hashing of the result of encoding said message to be signed M with the chosen padding scheme.

The client device may similarly generate a client part of the current RSA signature HS1 from the client device private exponent component dA and from an updated client dynamic offset hA', said updated client dynamic offset hA' being function of the current client dynamic offset hA and of a client shift value cA, said client shift value cA being function of the current client value pvA.

In an embodiment, when the client device secret key is password protected, the user of the client device may have to provide a password value before the client devices generates the client part of said RSA signature HS1. In that case, the client device may generate a client part of said RSA signature HS1 whatever the password value provided by the user but the client part of said RSA signature HS1 will be valid, ie usable to produce the full RSA signature, only if the user provided the right password value.

In an embodiment the client part of the current RSA signature HS1 may be generated by the client device A using as signing key the sum of the client device private exponent component dA and the updated client dynamic offset hA'. In an embodiment HS1=H(M)$^{dA+hA'}$ mod n.

In an embodiment, the updated client dynamic offset hA' is equal to the sum of the current client dynamic offset hA and the client shift value cA: hA'=hA+cA.

In an embodiment the client shift value cA is generated by a pseudo random number generator from the secret value seed_offset pre-shared between the client device A and the server device B and from the current client value pvA: cA=PRNG(seed_offset, pvA).

By doing so, the current RSA signature may then be generated by combining said client part of the current RSA signature HS1 and said server part of the current RSA signature HS2. In an embodiment the current RSA signature of said message to be signed M is equal to HS1*HS2 mod n. Assuming that the current client value pvA and the current client value pvB were set to a shared value during the last execution of the signature process, the client shift value cA and the server shift value cB are identical and the updated dynamic offsets of the client hA' and of the server hB' cancel each other. HS1*HS2 is then indeed equal to the RSA signature of message M with the private exponent component d of the shared RSA key.

In an embodiment, the signing phase P2 can comprise a second reception step S6 during which the server device receives the client part of the current RSA signature HS1 from said client device; and a third generation step S7 during which the server device generating the current RSA signature by combining the received client part of the current RSA signature HS1 and the server part of the current RSA signature HS2.

When the client device private key is password protected the generation of the RSA signature may fail because the user of the client device provided a wrong password value. In that case the client part of said RSA signature HS1 provided by the client device is not correct, and the generation of the RSA signature fails. Such a wrong password value may result from a mistake of the user when entering the password value. Consequently there is a need to allow the user to enter at least one time a new password value in order to correct this mistake.

In order to do so, in one embodiment:

The server device stores a ratification counter used to remember the number of successive failed attempts to provide the correct client password. Such a ratification counter may be initialized to zero by the server device before any signature process has been performed.

When the generation of the RSA signature is a success, the server sets said ratification counter to a third default value. In such a case the ratification counter can be reset, for example to zero.

When the generation of the RSA signature is a failure, the server increments said ratification counter. In such a case, the signature generation failed for the password value provided by the user, even after fixing client state. Such a failure is memorized by increasing the ratification counter. The method then comprises an additional password retry if the ratification counter is below a second predetermined threshold. Each time the user of the client device enters a new password value, the client device generates a new client part of said RSA signature HS1 and the server device performs the handshake and the signing phases in order to try to generate a valid RSA signature for the message to be signed M. The user is allowed to retry until the ratification counter reached the second predetermined threshold. After such a number of unsuccessful retries, it can be assumed that the user forgot his client password or that the client device is not a legitimate device. In that case the client device private key and the server device key may be revoked and replaced by new keys.

Alternately, the server device may send the server part of the current RSA signature HS2 to the client device; and the client device may then generate the current RSA signature by combining the client part of the current RSA signature HS1 and the received server part of the current RSA signature HS2.

In an embodiment, the signature of the message M to be signed can be performed using a padding scheme as mentioned above. In that case, the client part of the current RSA signature may be equal to $(EM)^{dA+hA'}$ mod n and the server part of the current RSA signature may be equal to $(EM)^{dB-hB'}$ mod n with EM the padded message. For example in the case of RSA-PSS padding, EM=EMSA-PSS-ENCODE(M,salt) with salt a pre-shared random salt value, and EMSA-PSS encoding described in PKCS #1v2.2.

In an embodiment, the signing phase may also comprise verifying the generated current RSA signature. This enables the server device to verify that the RSA signature was successfully generated based on both parts of the signature.

After such a generation of the current signature, the server device performs additional steps in order to prepare for the generation of the next signature of the second message to be signed M'.

The signing phase P2 then comprises a setting step S8 during which the server client sets the current server dynamic offset hB to the updated server dynamic offset hB' value, the current server value pvB to the value of the next server value pvB_next and the next server value pvB_next to a second default value NULL.

In order to remain synchronized with the server device, the client device shall similarly set the current client dynamic offset hA to the updated client dynamic offset hA' value, the current client value to the value of the next client value pvA_next and the next client value pvA_next to the first default value DUMMY.

In an embodiment, the server device may send an acknowledge message to the client device at the end of the setting step in order to instruct the client device to perform such settings.

After such settings, the current client value pvA and the current server value pvB have been updated to a new shared value that can be used for generating identical new shift values cA and cB and coherent updated dynamic offsets hA' and hB' that can be used to generate the next signature of the second message to be signed M'.

The method then comprises performing P3 the handshake phase and the signing phase with the next signature as current signature, for generating the next signature.

Figure 6:
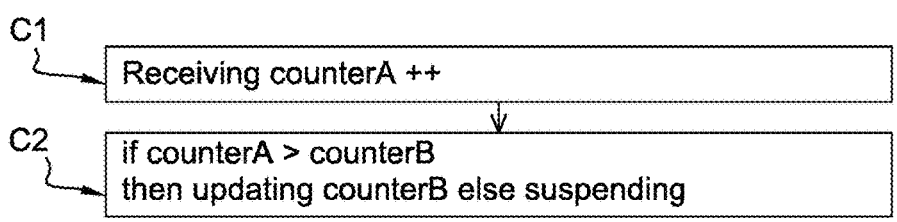
FIG. 6 illustrates schematically an embodiment of the present invention in order to improve resistance against device cloning attacks.

As depicted on FIG. 6, in order to improve the resistance of the method against device cloning attacks each device may store a counter and before each signature generation the client device may increment its counter and transmit it to the server device which may then compare it to its own counter and stop the signature generation if the received counter value is not greater than its own counter value. By doing so, the server device can detect a clone device which would have a counter with an old value, lower than the counter value stored by the server device.

More precisely, the client device A may store a client clone counter counter A and the server device B may store a server clone counter counter B; and both the handshake phase and the signing phase may comprise a third reception step C1 during which the server client receives from the client device the client clone counter incremented by one unit, and a verification step C2 during which the server device checks if the incremented client clone counter is greater than the server clone counter. If the incremented client clone counter is greater than the server clone counter, the server device may update said server clone counter with the received value of the client clone counter. Else, the server device may suspend performing said method according to the first aspect.

In a second aspect, the invention also relates to a computer program product directly loadable into the memory of at least one computer, comprising software code instructions for performing by a computer's processor the steps of the method according to the first aspect when said product is run on the computer.

In a third aspect, the invention also relates to said server B comprising said processor 401 and said interface 403 configured to perform the steps of the method according to the first aspect, said memory 402 configured to store said server device private key, said current server value pvB, said next server value pvB_next, and said current server dynamic offset hB.

In a fourth aspect the invention also relates to a system 100 comprising said server device B and said client device A.

By sharing during the generation of the current signature a common value for the next client value pvA and the next server value pvB, to be used for updating the client and server dynamic offsets during the generation of the next signature, and by enabling to fix the client state at the beginning of the handshake phase, the proposed method therefore enables to perform SMC signature process based on RSA scheme, protected against device cloning attacks using the floating exponent technique and to maintain client and server synchronization, even after a failure leading to a desynchronization, while remaining secure against device cloning attacks.

The invention claimed is:

1. A method of secure generation by a client device (A) and a server device (B) of at least a first RSA signature (H(M)^d), called current signature, of a first message to be signed (M) and a second RSA signature (H(M')^d), called next signature, of a second message to be signed (M'), with a private exponent component d of an RSA key (p, q, N, d, e), where e is a public exponent component, N is a RSA modulus, p, q primes such N=p·q and e·d=1 modulo phi(N) with phi(N) Euler's function,
   wherein said client device (A) stores a client device private key equal to (N, dA) with dA representing a client device private exponent component, a current client value (pvA), a next client value (pvA_next) and a current client dynamic offset (hA),
   and wherein said server device (B) stores a server device private key equal to (N, dB) with dB representing a server device private exponent component, a current server value (pvB), a next server value (pvB_next), where dB=d−dA modulo phi(N), and a current server dynamic offset (hB),
   said method comprising:
      a handshake phase performed by the server device (B) comprising:
         a. receiving from the client device (A) a handshake request comprising a hash of the next client value (pvA_next),
         b. checking the value of the next client value (pvA_next) and:
            when the next client value (pvA_next) equals a first default value (DUMMY):
               generating a new value (x) and updating the next server value (pvB_next) with the generated new value, sending to the client device (A) the generated new value (x), to be used by the client device as next client value (pvA_next),
when the next client value (pvA_next) is not equal to said first default value (DUMMY):
  checking the value of the next server value (pvB_next),
  when the next server value (pvB_next) is equal to a second default value (NULL) and the next client value (pvA_next) equals the current server value (pvB):
    sending to the client device (A) a fix request asking the client device (A) to update the current client value (pvA) with the value of the stored next client value (pvA_next),
    generating a new value (x) and updating the next server value (pvB_next) with the generated new value,
    sending to the client device (A) the generated new value (x), to be used by the client device as next client value (pvA_next),
  when the next server value (pvB_next) is equal to said second default value (NULL) and the next client value (pvA_next) is not equal to the current server value (pvB), suspending performing said method,
  when the next server value (pvB_next) is not equal to said second default value (NULL):
    generating a new value (x) and updating the next server value (pvB_next) with the generated new value,
    sending to the client device (A) the generated new value (x), to be used by the client device as next client value (pvA_next),
and signing phase performed by the server device (B) after the handshake phase and generating the current signature; said signing phase comprising:
a. generating a server part of the current signature (HS2) from the server device private exponent component (dB) and from an updated server dynamic offset (hB'), said updated server dynamic offset (hB') being function of the current server dynamic offset (hB) and of a server shift value (cB), said server shift value (cB) being function of the current server value (pvB), such that the current signature can be generated by combining said server part of the current signature (HS2) and a client part of the current signature (HS1) generated by the client device (A) from the client device private exponent component (dA) and from an updated client dynamic offset (hA'), said updated client dynamic offset (hA') being function of the current client dynamic offset (hA) and of a client shift value (cA), said client shift value (cA) being function of the current client value (pvA),
b. setting the current server dynamic offset (hB) to the updated server dynamic offset (hB') value, the current server value (pvB) to the value of the next server value (pvB_next) and the next server value (pvB_next) to said second default value (NULL),
the current client dynamic offset (hA) being set to the updated client dynamic offset (hA') value, the current client value being set to the value of the next client value (pvA_next) and the next client value (pvA_next) being set to said first default value (DUMMY),
performing the handshake phase and the signing phase with the next signature as current signature, for generating the next signature.

2. The method of claim 1, wherein the client device private exponent component dA or the server device private exponent component dB is a random integer in $[\phi(B+N)]$.

3. The method of claim 1, wherein said client shift value (cA) is generated by a pseudo random number generator from a secret value (seed_offset) pre-shared between the client device (A) and the server device (B) and from the current client value (pvA), and said server shift value (cB) is generated by a pseudo random number generator from said secret value (seed_offset) and from the current server value (pvB).

4. The method of claim 1, wherein said updated client dynamic offset (hA') is equal to the sum of the current client dynamic offset (hA) and the client shift value (cA), and wherein said updated server dynamic offset (hB') is equal to the sum of the current server dynamic offset (hB) and the server shift value (cB).

5. The method of claim 1, wherein said client part of the current signature (HS1) is generated by the client device (A) using as signing key the sum of the client device private exponent component (dA) and the updated client dynamic offset (hA').

6. The method of claim 1, wherein said server part of the current signature (HS2) is generated by the server device (B) using as signing key the result of subtracting the updated server dynamic offset (hB') from the server device private exponent component (dB).

7. The method of claim 1, wherein said signing phase comprises:
  receiving (S6) said client part of the current signature (HS1) from said client device (A),
  generating (S7) the current signature by combining the received client part of the current signature (HS1) and said server part of the current signature (HS2).

8. The method of claim 7, wherein said signing phase comprises verifying the generated current signature.

9. The method of claim 1, wherein said client device (A) stores a client clone counter (counterA) and said server device (B) stores a server clone counter (counterB),
and said method comprising:
  incrementing, by the client device, the client clone counter by one unit,
  receiving from the client device the incremented client clone counter,
  checking if the incremented client clone counter is greater than the server clone counter and:
    if the incremented client clone counter is greater than the server clone counter, updating said server clone counter with the received value of the client clone counter,
    else, suspending performing said method.

10. The method of claim 1, wherein the client part of the current signature HS1 of a message to be signed M is equal to $H(M)^{dA+hA'} \mod n$, the server part of the current signature HS2 of said message to be signed M is equal to $H(M)^{dB-hB'} \mod n$, and the current signature of said message to be signed M is equal to $HS1*HS2 \mod n$, with $H(M)$ a hashing of said message to be signed M.

11. A computer program product directly stored in the memory of at least one computer, comprising software code instructions for performing by a computer's processor, when said product is run on the computer, to cause the processor to perform secure generation by the server device (B), in collaboration with a client device (A), of at least a first signature ($H(M)^d$), called current signature, of a first message to be signed (M) and a second signature ($H(M')^d$), called next signature, of a second message to be signed (M'), with a private exponent component d of an RSA key (p, q, N, d, e), where e is a public exponent component, N is a RSA modulus, p, q primes such N=p·q and e·d=1 modulo phi(N) with phi(N) Euler's function,
  wherein said client device (A) stores a client device private key equal to (N, dA) with dA representing a client device private exponent component, a current client value (pvA), a next client value (pvA_next) and a current client dynamic offset (hA),
  and wherein said server device (B) stores a server device private key equal to (N, dB) with dB representing a server device private exponent component, a current server value (pvB), a next server value (pvB_next), where dB=d−dA modulo phi(N), and a current server dynamic offset (hB),
  the instructions causing the processor of the server to perform:
    a handshake phase, comprising:
    c. receiving from the client device (A) a handshake request comprising a hash of the next client value (pvA_next),
    d. checking the value of the next client value (pvA_next) and:
      when the next client value (pvA_next) equals a first default value (DUMMY):
        generating a new value (x) and updating the next server value (pvB_next) with the generated new value,
        sending to the client device (A) the generated new value (x), to be used by the client device as next client value (pvA_next),
      when the next client value (pvA_next) is not equal to said first default value (DUMMY):
        checking the value of the next server value (pvB_next),
        when the next server value (pvB_next) is equal to a second default value (NULL) and the next client value (pvA_next) equals the current server value (pvB):
          sending to the client device (A) a fix request asking the client device (A) to update the current client value (pvA) with the value of the stored next client value (pvA_next),
          generating a new value (x) and updating the next server value (pvB_next) with the generated new value,
          sending to the client device (A) the generated new value (x), to be used by the client device as next client value (pvA_next),
        when the next server value (pvB_next) is equal to said second default value (NULL) and the next client value (pvA_next) is not equal to the current server value (pvB), suspending performing said method,
        when the next server value (pvB_next) is not equal to said second default value (NULL):
          generating a new value (x) and updating the next server value (pvB_next) with the generated new value,
          sending to the client device (A) the generated new value (x), to be used by the client device as next client value (pvA_next),
    and a signing phase performed by the server device (B) after the handshake phase and generating the current signature; said signing phase comprising:
    c. generating a server part of the current signature (HS2) from the server device private exponent component (dB) and from an updated server dynamic offset (hB'), said updated server dynamic offset (hB') being function of the current server dynamic offset (hB) and of a server shift value (cB), said server shift value (cB) being function of the current server value (pvB), such that the current signature can be generated by combining said server part of the current signature (HS2) and a client part of the current signature (HS1) generated by the client device (A) from the client device private exponent component (dA) and from an updated client dynamic offset (hA'), said updated client dynamic offset (hA') being function of the current client dynamic offset (hA) and of a client shift value (cA), said client shift value (cA) being function of the current client value (pvA),
    d. setting the current server dynamic offset (hB) to the updated server dynamic offset (hB') value, the current server value (pvB) to the value of the next server value (pvB_next) and the next server value (pvB_next) to said second default value (NULL),
    the current client dynamic offset (hA) being set to the updated client dynamic offset (hA') value, the current client value being set to the value of the next client value (pvA_next) and the next client value (pvA_next) being set to said first default value (DUMMY),
    performing the handshake phase and the signing phase with the next signature as current signature, for generating the next signature.

12. Server comprising a processor and an interface, a memory configured to store a server device private key, a current server value (pvB), a next server value (pvB_next), and a current server dynamic offset (hB), the processor programmed to perform secure generation by the server device (B), in collaboration with a client device (A), of at least a first signature (H(M)^d), called current signature, of a first message to be signed (M) and a second signature (H(M')^d), called next signature, of a second message to be signed (M'), with a private exponent component d of an RSA key (p, q, N, d, e), where e is a public exponent component, N is a RSA modulus, p, q primes such N=p·q and e·d=1 modulo phi(N) with phi(N) Euler's function,
  wherein said client device (A) stores a client device private key equal to (N, dA) with dA representing a client device private exponent component, a current client value (pvA), a next client value (pvA_next) and a current client dynamic offset (hA),
  and wherein said server device (B) stores a server device private key equal to (N, dB) with dB representing a server device private exponent component, a current server value (pvB), a next server value (pvB_next), where dB=d−dA modulo phi(N), and a current server dynamic offset (hB),
  the instructions causing the processor of the server to perform:
    a handshake phase, comprising:
    e. receiving from the client device (A) a handshake request comprising a hash of the next client value (pvA_next),
    f. checking the value of the next client value (pvA_next) and:
      when the next client value (pvA_next) equals a first default value (DUMMY):
        generating a new value (x) and updating the next server value (pvB_next) with the generated new value, sending to the client device (A) the generated new value (x), to be used by the client device as next client value (pvA_next),
when the next client value (pvA_next) is not equal to said first default value (DUMMY):
checking the value of the next server value (pvB_next),
when the next server value (pvB_next) is equal to a second default value (NULL) and the next client value (pvA_next) equals the current server value (pvB):
sending to the client device (A) a fix request asking the client device (A) to update the current client value (pvA) with the value of the stored next client value (pvA_next),
generating a new value (x) and updating the next server value (pvB_next) with the generated new value,
sending to the client device (A) the generated new value (x), to be used by the client device as next client value (pvA_next),
when the next server value (pvB_next) is equal to said second default value (NULL) and the next client value (pvA_next) is not equal to the current server value (pvB), suspending performing said method,
when the next server value (pvB_next) is not equal to said second default value (NULL):
generating a new value (x) and updating the next server value (pvB_next) with the generated new value,
sending to the client device (A) the generated new value (x), to be used by the client device as next client value (pvA_next),
and a signing phase performed by the server device (B) after the handshake phase and generating the current signature; said signing phase comprising:
e. generating a server part of the current signature (HS2) from the server device private exponent component (dB) and from an updated server dynamic offset (hB'), said updated server dynamic offset (hB') being function of the current server dynamic offset (hB) and of a server shift value (cB), said server shift value (cB) being function of the current server value (pvB), such that the current signature can be generated by combining said server part of the current signature (HS2) and a client part of the current signature (HS1) generated by the client device (A) from the client device private exponent component (dA) and from an updated client dynamic offset (hA'), said updated client dynamic offset (hA') being function of the current client dynamic offset (hA) and of a client shift value (cA), said client shift value (cA) being function of the current client value (pvA),
f. setting the current server dynamic offset (hB) to the updated server dynamic offset (hB') value, the current server value (pvB) to the value of the next server value (pvB_next) and the next server value (pvB_next) to said second default value (NULL),
the current client dynamic offset (hA) being set to the updated client dynamic offset (hA') value, the current client value being set to the value of the next client value (pvA_next) and the next client value (pvA_next) being set to said first default value (DUMMY),
performing the handshake phase and the signing phase with the next signature as current signature, for generating the next signature.

13. A system comprising a server (B) and a client device (A), wherein the server (B) comprises a processor and an interface, a memory configured to store a server device private key, a current server value (pvB), a next server value (pvB_next), and a current server dynamic offset (hB), the processor programmed to perform secure generation by the server device (B), in collaboration with a client device (A), of at least a first RSA signature (H(M)^d), called current signature, of a first message to be signed (M) and a second signature (H(M')^d), called next signature, of a second message to be signed (M'), with a private exponent component d of an RSA key (p, q, N, d, e), where e is a public exponent component, N is a RSA modulus, p, q primes such N=p·q and e·d=1 modulo phi(N) with phi(N) Euler's function,
wherein said client device (A) stores a client device private key equal to (N, dA) with dA representing a client device private exponent component, a current client value (pvA), a next client value (pvA_next) and a current client dynamic offset (hA),
and wherein said server device (B) stores a server device private key equal to (N, dB) with dB representing a server device private exponent component, a current server value (pvB), a next server value (pvB_next), where dB=d−dA modulo phi(N), and a current server dynamic offset (hB),
the processor programmed to perform:
a handshake phase, comprising:
receiving from the client device (A) a handshake request comprising a hash of the next client value (pvA_next),
checking the value of the next client value (pvA_next) and:
when the next client value (pvA_next) equals a first default value (DUMMY):
generating a new value (x) and updating the next server value (pvB_next) with the generated new value,
sending to the client device (A) the generated new value (x), to be used by the client device as next client value (pvA_next),
when the next client value (pvA_next) is not equal to said first default value (DUMMY):
checking the value of the next server value (pvB_next),
when the next server value (pvB_next) is equal to a second default value (NULL) and the next client value (pvA_next) equals the current server value (pvB):
sending to the client device (A) a fix request asking the client device (A) to update the current client value (pvA) with the value of the stored next client value (pvA_next),
generating a new value (x) and updating the next server value (pvB_next) with the generated new value,
sending to the client device (A) the generated new value (x), to be used by the client device as next client value (pvA_next),
when the next server value (pvB_next) is equal to said second default value (NULL) and the next client value (pvA_next) is not equal to the current server value (pvB), suspending performing said method,
when the next server value (pvB_next) is not equal to said second default value (NULL):

generating a new value (x) and updating the next server value (pvB_next) with the generated new value, sending to the client device (A) the generated new value (x), to be used by the client device as next client value (pvA_next), and a signing phase performed by the server device (B) after the handshake phase and generating the current signature; said signing phase comprising:

generating a server part of the current signature (HS2) from the server device private exponent component (dB) and from an updated server dynamic offset (hB'), said updated server dynamic offset (hB') being function of the current server dynamic offset (hB) and of a server shift value (cB), said server shift value (cB) being function of the current server value (pvB), such that the current signature can be generated by combining said server part of the current signature (HS2) and a client part of the current signature (HS1) generated by the client device (A) from the client device private exponent component (dA) and from an updated client dynamic offset (hA'), said updated client dynamic offset (hA') being function of the current client dynamic offset (hA) and of a client shift value (cA), said client shift value (cA) being function of the current client value (pvA), setting the current server dynamic offset (hB) to the updated server dynamic offset (hB') value, the current server value (pvB) to the value of the next server value (pvB_next) and the next server value (pvB_next) to said second default value (NULL), the current client dynamic offset (hA) being set to the updated client dynamic offset (hA') value, the current client value being set to the value of the next client value (pvA_next) and the next client value (pvA_next) being set to said first default value (DUMMY), performing the handshake phase and the signing phase with the next signature as current signature, for generating the next signature.

\* \* \* \* \*